G. R. BARKSDALE.
AIR MOISTENING DEVICE.
APPLICATION FILED APR. 30, 1917.

1,330,574.

Patented Feb. 10, 1920.

Inventor
George R. Barksdale,
by
His Attorney.

UNITED STATES PATENT OFFICE.

GEORGE R. BARKSDALE, OF SCHENECTADY, NEW YORK.

AIR-MOISTENING DEVICE.

1,330,574.            Specification of Letters Patent.       Patented Feb. 10, 1920.

Application filed April 30, 1917. Serial No. 165,587.

*To all whom it may concern:*

Be it known that I, GEORGE R. BARKSDALE, a citizen of the United States, residing at Schenectady, in the county of Schenectady, State of New York, have invented certain new and useful Improvements in Air-Moistening Devices, of which the following is a specification.

In connection with the operation of internal combustion engines, for example, automobile engines, it has been found that about 25% of the so-called carbon found in the cylinders is dust and dirt which has been sucked in through the air intake of the carbureter. The lubricating oil in the cylinder or cylinders of an internal combustion engine forms a sticky, gum-like substance after each explosion and tends to remain in a more or less plastic condition and the dust and dirt entering each cylinder sticks to this gummy substance, accumulating on the cylinder wall opposite the intake valve. This is very detrimental to the engine for numerous and obvious reasons.

One object of the present invention is to provide an improved apparatus and arrangement for straining the air as it passes through the intake of the carbureter so as to separate out from the air all dust, dirt, or other particles of foreign matter, and in carrying out this part of the invention, I provide a strainer formed of suitable porous material which I keep moistened or saturated with a suitable liquid or gas, such as steam for example.

A further object of my invention is to provide an improved means for introducing the liquid just referred to into the intake of the carbureter and onto said porous strainer.

It is well known that the introduction of a certain amount of water into the cylinder or cylinders of an internal combustion engine is desirable and advantageous, as among other things, it prevents the formation and deposition of carbon, gives a greater mileage per gallon of fuel, and causes the engine to run more smoothly.

I preferably employ, therefore, as the liquid above referred to, water, since by the use of it I obtain in connection with the improved straining means also the advantage of moistened air for use in the engine.

Viewed from another aspect, a further object of my invention may be considered, that of providing an improved arrangement for introducing water into the charge of explosive mixture fed to the cylinder or cylinders of an internal combustion engine.

For a consideration of what I believe to be novel and my invention, attention is directed to the accompanying specification and the claims appended thereto.

Figure 1:
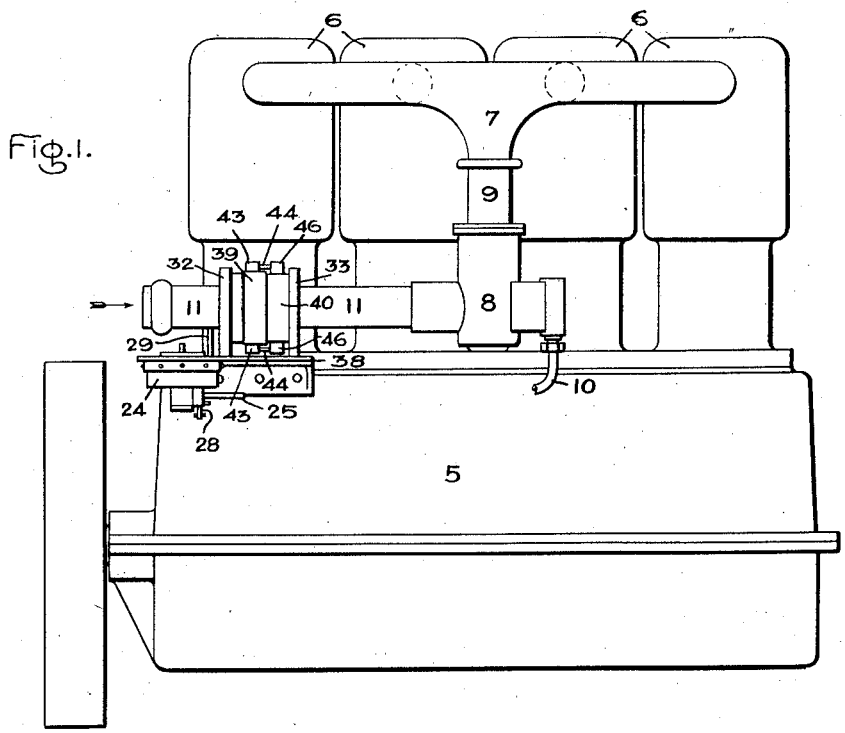
Figure 2:
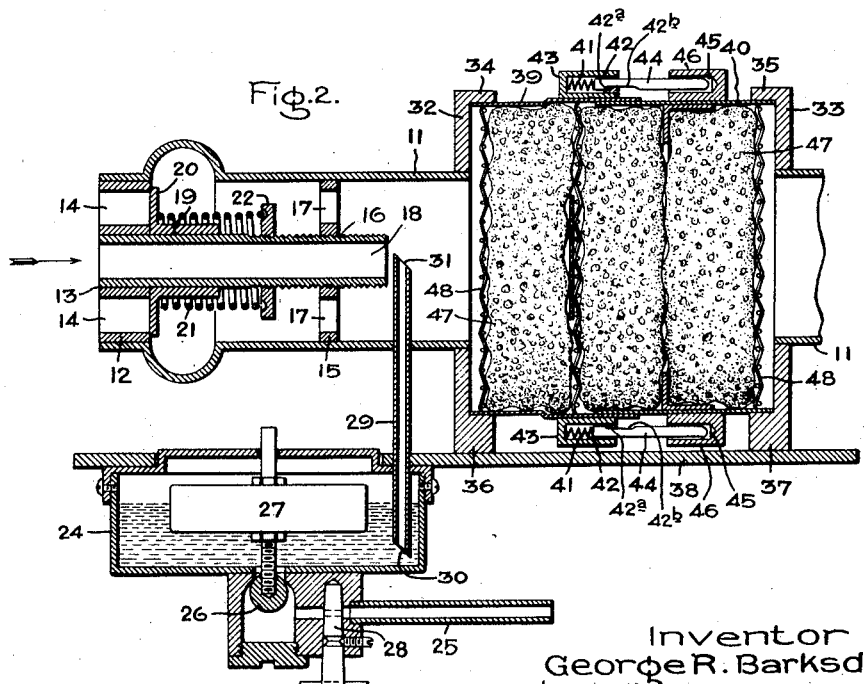

In the drawing, Figure 1 is a side elevation of an internal combustion engine equipped with one form of apparatus embodying my invention, and Fig. 2 is a vertical sectional view through the apparatus.

Referring to the drawing, 5 indicates the crank casing of an internal combustion engine, 6 the cylinders thereof, and 7 the manifold through which the explosive mixture is drawn into the cylinders. 8 indicates a fuel carbureter which may be of any suitable structure and which is connected to the manifold 7 by a conduit 9. 10 indicates a pipe through which fuel is fed to the carbureter and 11 indicates the air intake for the carbureter. The structure so far described is only by way of example, and may be taken as illustrative of any suitable arrangement of engine and carbureter.

Referring now more particularly to Fig. 2, in the end of the air intake pipe 11 is a plate 12 having a central opening 13 around which are a number of openings 14. Spaced from the plate 12 and also located in pipe 11 is a plate 15 having a central opening 16 around which are openings 17. Supported in the central openings 13 and 16 of the plates 12 and 15 is a pipe 18 which forms the main air inlet to the carbureter, and is always open. The openings 14, which form the auxiliary air inlet to the carbureter, are normally closed by a valve comprising a sleeve 19 which slides on pipe 18 and has a flange 20 which covers the openings 14. The valve is normally pressed to its seat by a spring 21 arranged between the flange 20 and a collar 22 on pipe 18. As is well understood, the valve is opened by the suction of the engine to introduce more or less air, in addition to that entering through the pipe 18, as may be required for the efficient operation of the engine. Located beneath the pipe 11 is a casing 24 to which a liquid, preferably water, is fed from any suitable source by a pipe 25. The admission of water to the casing is controlled by a suitable ball valve 26 connected to a float 27. This forms a well known type of float feed for maintaining a constant level of water in the casing. At 28 is a suitable hand valve by means of which the supply of water to casing 24 can be regulated. Extending from a point below the level of the water in casing 24 to a point directly in front of the inner end of pipe 18 is a tube 29, the ends of which are beveled as indicated at 30 and 31. The tube 29 is located so that the beveled side 31 faces away from the end of pipe 18.

The pipe 11 is preferably formed in two spaced sections between which is located a casing comprising end walls 32 and 33 attached to the adjacent ends of the two pipe sections and provided with flanges 34 and 35. The end walls 32 and 33 may be provided with flat bases 36 and 37 which rest on a suitable support 38 and may be fastened thereto if desired. Between the end walls 32 and 33 is the side wall comprising two sections 39 and 40 which telescope one within the other and fit within the flanges 34 and 35. The sections 39 and 40 are pressed apart by means of springs 41 located in pockets 42 in lugs 43 carried by casing section 39, which springs engage the ends of pins 44 which enter sockets 45 in lugs 46 carried by casing section 40. The pins 44 are retained in pockets 42 by projection 42$^a$ which engage in grooves 42$^b$ in pins 44. Within the casing is located a suitable material for straining the air to remove dust particles therefrom. For this purpose, when water is employed as the moistening liquid, layers of sponge or felt or other suitable material, as indicated at 47, may be used, held between wire screens 48. By the arrangement described, the material 47 may be removed by pressing the two sections 39 and 40 until they telescope sufficiently to come from under flanges 34 and 35, when, as is obvious, they may be removed. The material 47 is sufficiently compressible to permit of this operation. The two sections can then be separated and material 47 removed. The lugs 43 and 46 may be utilized in squeezing the sections together. The sections 39 and 40 may be replaced in the same manner.

In operation, the air in being drawn through pipe 18 on the suction stroke, passes over the end of tube 29 and creates a suction which causes water to be drawn up through tube 29 and discharged into the air in the form of a fine spray. The suction effect on the end of tube 29 is created after the manner of the well known Pitot tube. The water carried along by the air soon saturates the sponge or felt 47 and more or less water is carried along with the air to the carbureter and hence to the engine cylinder or cylinders. The sponge or felt 47 serves to strain the air taking all particles of dust out of it. The sponge or felt 47 may be readily removed for cleaning at suitable intervals as explained above. As is well known with a high speed multi-cylinder engine, the suction is practically continuous so that with such an engine there would be a continuous stream of air flowing past the end of tube 29 and the suction thereon would be continuous. This is the action which would occur in the case of an automobile engine to which the invention is particularly adapted.

In accordance with the provisions of the patent statutes, I have described the principle of operation of my invention together with the apparatus which I now consider to represent the best embodiment thereof; but I desire to have it understood that the apparatus shown is only illustrative and that the invention can be carried out by other means.

What I claim as new and desire to secure by Letters Patent of the United States is:—

1. The combination of an internal combustion engine, a carbureter therefor having an air inlet, an air conduit connected to said inlet, a filtering material adapted to be saturated with water located in said air conduit, a water supply reservoir, and a tube having one end located in the water supply reservoir and the other end in said air conduit in advance of said filtering substance as regards the flow of air whereby the flow of air through said conduit effects the moistening of such air and the saturation of said filtering material.

2. The combination of an internal combustion engine, a carbureter therefor having an air inlet, a length of pipe connected to the inlet, a second pipe of less diameter than the first named pipe, such second pipe being located in the outer end of the first named pipe, an auxiliary air valve controlling the opening between said pipes, a casing containing a supply of water located adjacent said first named pipe, a tube which extends from a point below the level of the water in the casing to a point in front of the opening through said second pipe, and a strainer located in the first named pipe between said tube and the carbureter and comprising material which becomes saturated with water.

3. An air filtering means comprising a conduit, a filtering substance adapted to be saturated with liquid located therein, a liquid supply, and a tube having one end located in the liquid supply and the other end in said conduit in advance of said filtering substance as regards the flow of air whereby the flow of air through the conduit effects the saturation of said filtering substance.

4. An air filtering means comprising a conduit formed in two sections, a removable casing located between said sections and containing a filtering substance adapted to be saturated with a liquid, a liquid supply adjacent the conduit, and a tube extending from said liquid supply to a point within said conduit in advance of said filtering substance as regards the flow of air, whereby the flow of air through said conduit sucks liquid through said tube and sprays it against said filtering substance to saturate the same.

In witness whereof I have hereunto set my hand this 28th day of April, 1917.

GEORGE R. BARKSDALE.